(12) United States Patent
Jesme

(10) Patent No.: US 7,591,415 B2
(45) Date of Patent: Sep. 22, 2009

(54) PASSPORT READER FOR PROCESSING A PASSPORT HAVING AN RFID ELEMENT

(75) Inventor: Ronald D. Jesme, Plymouth, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 621 days.

(21) Appl. No.: 10/953,200

(22) Filed: Sep. 28, 2004

(65) Prior Publication Data
US 2006/0065714 A1   Mar. 30, 2006

(51) Int. Cl.
G06K 5/00 (2006.01)
(52) U.S. Cl. ............... 235/380; 235/451; 235/381; 340/5.86; 340/10.1; 340/572.1
(58) Field of Classification Search ........... 235/380, 235/451, 381; 340/10.1, 5.86, 572.1
See application file for complete search history.

(56) References Cited

U.S. PATENT DOCUMENTS

| | | | |
|---|---|---|---|
| 4,135,183 A | | 1/1979 | Heltemes |
| 4,243,980 A | | 1/1981 | Lichtblau |
| 4,251,808 A | | 2/1981 | Lichtblau |
| 4,260,990 A | | 4/1981 | Lichtblau |
| 4,373,163 A | | 2/1983 | Vandebult |
| 4,872,018 A | | 10/1989 | Feltz et al. |
| 4,963,880 A | * | 10/1990 | Torre et al. ............ 343/866 |
| 5,319,354 A | * | 6/1994 | Myatt ............... 340/572.7 |
| 5,642,160 A | * | 6/1997 | Bennett ............... 235/380 |
| 5,821,525 A | | 10/1998 | Takebayashi |
| 6,081,238 A | | 6/2000 | Alicot |
| 6,163,305 A | | 12/2000 | Murakami et al. |
| 6,611,612 B2 | | 8/2003 | Mann |
| 6,618,016 B1 | * | 9/2003 | Hannan et al. ............ 343/705 |
| 2003/0063034 A1 | | 4/2003 | Taniguchi et al. |
| 2003/0163696 A1 | | 8/2003 | Rancien |
| 2003/0168514 A1 | | 9/2003 | Rancien et al. |
| 2004/0233040 A1 | * | 11/2004 | Lane et al. ............ 340/5.86 |
| 2005/0128304 A1 | * | 6/2005 | Manasseh et al. ...... 348/207.99 |

FOREIGN PATENT DOCUMENTS

EP    1 128 464    8/2001

(Continued)

OTHER PUBLICATIONS

Information printed from Internet: www.ait.ca/html/products/full-page-readers.html, "Look the traveler straight in the eye—let us read their documents", 3M™ Full Page Reader, 3M™ Authentication Reader, 3M™ ePasport Reader, Sep. 27, 2004, 3 pages.

(Continued)

Primary Examiner—Michael G. Lee
Assistant Examiner—Allyson N Trail
(74) Attorney, Agent, or Firm—Melissa E. Buss

(57) ABSTRACT

A passport reader for processing a passport having an RFID element associated therewith. A exemplary embodiment of the invention provides a passport reader for processing a passport having an RFID element associated therewith including an RFID interrogation source for interrogating and obtaining information from the RFID element associated with a passport; and an antenna to transmit signals between an RFID element and the RFID interrogation source.

62 Claims, 9 Drawing Sheets

FOREIGN PATENT DOCUMENTS

| | | |
|---|---|---|
| EP | 1 130 541 A2 | 9/2001 |
| FR | 2 745 928 | 9/1997 |
| FR | 2839172 | 10/2003 |
| JP | 2000-036019 | 2/2000 |
| JP | 2003-347830 | 12/2003 |
| WO | WO 2004/006165 | 1/2004 |

OTHER PUBLICATIONS

Document entitled, "imPAX™—Full Page Imaging & Document Authentication", 3M AiT, Ltd., Copyright 2003, 2 pages, no month.

Document entitled, "PAX™—Multi-function Document Reading", 3M AiT, Ltd., Copyright 2002, 2 pages, no month.

International Standard, ISO/IEC 14443-1, First edition, Apr. 15, 2000, "Identification cards—Contactless integrated circuit(s) cards—Proximity cards—Part 1: Physical characteristics", 5 pages.

International Standard, ISO/IEC 14443-2, First edition, Jul. 1, 2001, "Identification cards—Contactless integrated circuit(s) cards—Proximity cards—Part 2: Radio frequency power and signal interface", 9 pages.

U.S. Application entitled "Tamper-Indicating Printable Sheet for Securing Documents of Value and Methods of Making the Same," Kuo et al., filed Aug. 6, 2004, having U.S. Appl. No. 10/913,850.

* cited by examiner

PASSPORT READER FOR PROCESSING A PASSPORT HAVING AN RFID ELEMENT

TECHNICAL FIELD

The present invention relates to a passport reader for processing a passport having an RFID element associated therewith. The present invention relates more particularly to a passport reader for processing a passport having an RFID element associated therewith, the reader including an RFID interrogation source for interrogating and obtaining information from the RFID element associated with a passport; and an antenna to transmit signals between an RFID element and the RFID interrogation source. The present invention also relates more particularly to methods of using a passport reader for processing a passport having an RFID element associated therewith.

BACKGROUND OF THE INVENTION

Electronic article surveillance ("EAS") systems detect the presence of small electronic devices placed on or in an article or carried by a person of interest, and are often used in retail or library environments to deter theft or other unauthorized removal of articles. These devices, which are commonly known as tags or markers, have typically contained only information regarding the presence of an item. This information could be obtained by electronically interrogating the tag, either intermittently or continuously. Examples of EAS systems including the following: U.S. Pat. No. 4,260,990; U.S. Pat. No. 4,251,808; U.S. Pat. No. 4,872,018; U.S. Pat. No. 4,135,183; U.S. Pat. No. 6,081,238.

Radio-Frequency Identification (RFID) technology has become widely used in virtually every industry, including transportation, manufacturing, waste management, postal tracking, airline baggage reconciliation, and highway toll management. A typical RFID system includes a plurality of RFID tags, at least one RFID reader or detection system having an antenna for communication with the RFID tags, and a computing device to control the RFID reader. The RFID reader includes a transmitter that may provide energy or information to the tags, and a receiver to receive identity and other information from the tags. The computing device processes the information obtained by the RFID reader. Examples of RFID antenna systems or non-contact integrated circuit reader/writer systems including the following: U.S. Pat. Publication No. 2003/0063034; Japanese Patent Publication No. 2003-347830; Japanese Patent Publication No. 2000-036019; and U.S. Pat. No. 6,163,305.

A variety of passport readers are known in the art. One example of a passport reader is commercially available from 3M Company based in St. Paul, Minn. and 3M AiT, Ltd. based in Ottawa, Ontario, Canada, as the 3M™ Full Page Reader (formerly sold as the AiT™ imPAX™ Reader).

SUMMARY OF THE INVENTION

One aspect of the present invention provides a passport reader for processing a passport having an RFID element associated therewith. In one exemplary embodiment of the passport reader, the passport reader, comprises:(a) an RFID interrogation source for interrogating and obtaining information from an RFID element associated with a passport; and (b) an antenna to transmit signals between an RFID element and the RFID interrogation source, wherein the antenna is configured to resemble a shape of a figure eight, and wherein the signals of the antenna are resistant to eavesdropping by other RFID readers.

In another exemplary embodiment of the passport reader, the passport reader, comprises: (a) an RFID interrogation source for interrogating and obtaining information from the RFID element associated with a passport; and (b) an antenna to transmit signals between an RFID element and the RFID interrogation source, wherein the antenna includes first portion and a second portion, wherein the first portion of the antenna includes a first periphery forming a first area and the second portion of the antenna includes a second periphery forming a second area, wherein the first area and second area are adjacent, and wherein the first portion and second portion of the antenna create opposing magnetic fields which cancel each other at a distance and allow near communications.

In another exemplary embodiment of the passport reader, the passport reader, comprises: (a) an RFID interrogation source for interrogating and obtaining information from the RFID element associated with a passport; and (b) an antenna to transmit signals between an RFID element and the RFID interrogation source, wherein the antenna is configured to resemble the shape of a figure eight, and wherein the antenna is resistant to signal jamming by signal jamming devices.

In yet another exemplary embodiment of the passport reader, the passport reader, comprises: (a) an RFID interrogation source for interrogating and obtaining information from the RFID element associated with a passport; and (b) an antenna to transmit signals between an RFID tag and RFID interrogation source, wherein the antenna includes first portion and a second portion, wherein the first portion of the antenna includes a first periphery forming a first area and the second portion of the antenna includes a second periphery forming a second area, wherein the first area and second area are adjacent, and wherein the signals of the antenna are resistant to eavesdropping by other RFID readers.

In another exemplary embodiment of the passport reader, the passport reader, comprises: (a) an RFID interrogation source for interrogating and obtaining information from an RFID element associated with a passport; and (b) an antenna to transmit signals between an RFID element and the RFID interrogation source, wherein the antenna is configured to resemble a shape of a figure eight having a first portion and a second portion, wherein the first portion and second portion of the antenna create opposing magnetic fields which cancel each other at a distance and allow near communications.

In another exemplary embodiment of the passport reader, the passport reader, comprises: (a) an RFID interrogation source for interrogating and obtaining information from the RFID element associated with a passport; and (b) an antenna to transmit signals between an RFID tag and RFID interrogation source, wherein the antenna includes first portion and a second portion, wherein the first portion of the antenna includes a first periphery forming a first area and the second portion of the antenna includes a second periphery forming a second area, wherein the first area and second area are adjacent, and wherein the antenna is resistant to signal jamming by signal jamming devices.

In yet another exemplary embodiment of the passport reader, the passport reader, comprises: (a) an RFID interrogation source for interrogating and obtaining information from the RFID element associated with a passport; and (b) an antenna to transmit signals between an RFID tag and the RFID interrogation source, wherein the antenna is configured to resemble a shape of a figure eight having a first portion and a second portion, wherein the first portion the antenna is adjacent a first portion of a passport and the second portion of the antenna is adjacent a second portion of a passport, and wherein the signals of the antenna are resistant to eavesdropping by other RFID readers.

In another exemplary embodiment of the passport reader, the passport reader, comprises: (a) an RFID interrogation source for interrogating and obtaining information from the RFID element associated with a passport; and (b) an antenna to transmit signals between an RFID tag and the RFID interrogation source, wherein the antenna is configured to resemble a shape of a figure eight having a first portion and a second portion, wherein the first portion the antenna is adjacent a first portion of a passport and the second portion of the antenna is adjacent a second portion of a passport, and wherein the first portion and second portion of the antenna create opposing magnetic fields which cancel each other at a distance and allow near communications.

In yet another exemplary embodiment of the passport reader, the passport reader, comprises: (a) an RFID interrogation source for interrogating and obtaining information from the RFID element associated with a passport; and (b) an antenna to transmit signals between an RFID tag and the RFID interrogation source, wherein the antenna is configured to resemble a shape of a figure eight having a first portion and a second portion, wherein the first portion the antenna is adjacent a first portion of a passport and the second portion of the antenna is adjacent a second portion of a passport, and wherein the antenna is resistant to signal jamming by signal jamming devices.

In another aspect of the above-mentioned embodiments, the antenna is configured to resemble a shape of a figure eight having a first portion and a second portion, wherein the first portion of the antenna is a first loop and the second portion of the antenna is a second loop. In another aspect of the above-mentioned embodiments, the first loop and second loop create opposing magnetic fields which cancel each other at a distance and allow near communications. In another aspect of the above-mentioned embodiments, the first loop of the antenna is adjacent a first portion of a passport and the second loop of the antenna is adjacent a second portion of a passport. In another aspect of this embodiment, the first portion of the passport is a page within a passport booklet and the second portion of the passport is another page within the passport booklet. In yet another aspect of the above-mentioned embodiments, the first loop is in a first plane and the second loop is in a second plane, wherein the first plane and the second plane are at an angle α relative to each other, and wherein the angle α is between the range of 90° to 270°.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

Figure 1:
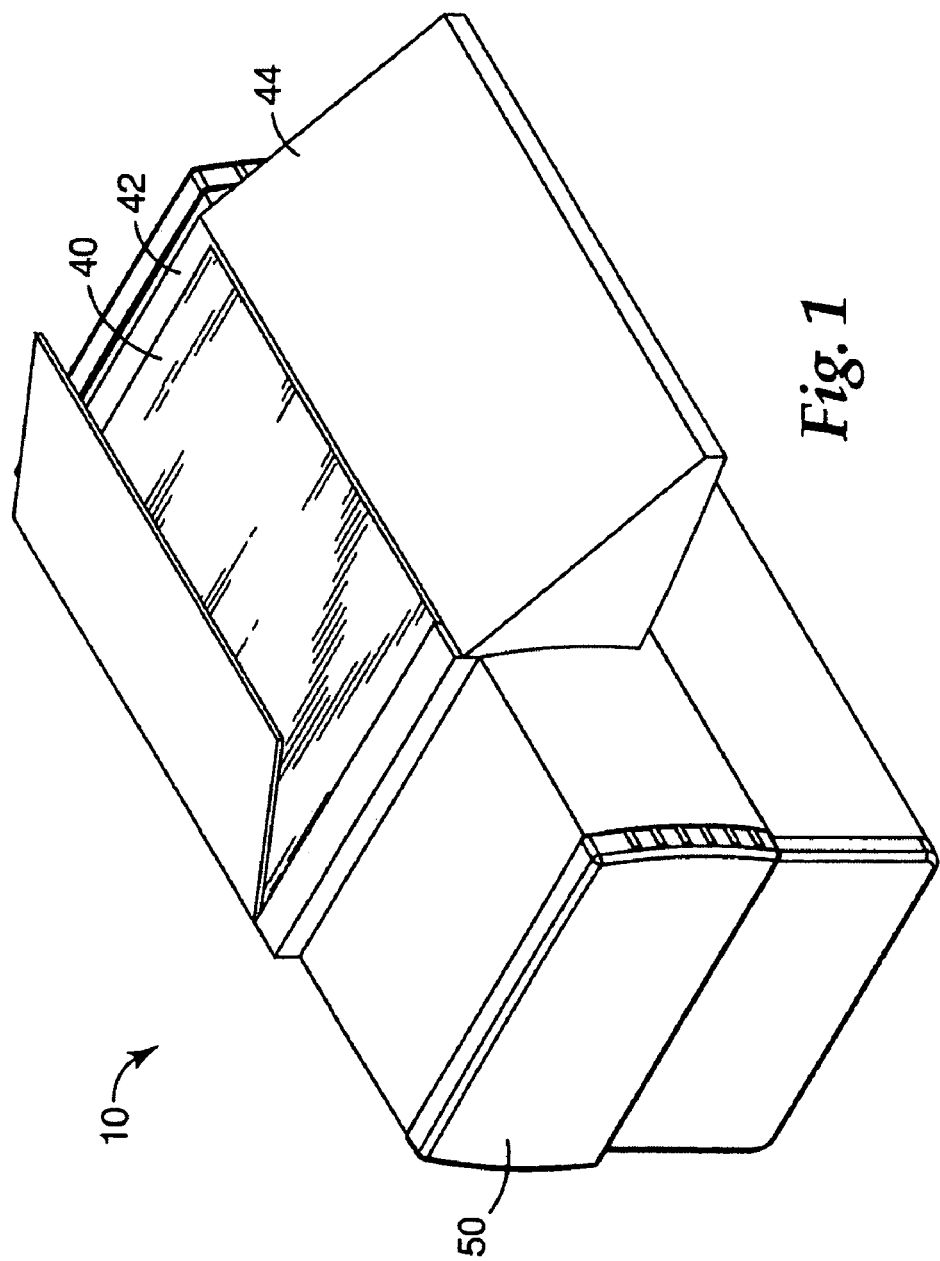
FIG. 1 is a perspective view of the passport reader of the present invention.

Documents of value such as passports, identification cards, entry passes, ownership certificates, financial instruments, and the like, are often assigned to a particular person by personalization data. Personalization data, often present as printed images, can include photographs, signatures, personal alphanumeric information, and barcodes, and allows human or electronic verification that the person presenting the document for inspection is the person to whom the document is assigned. Many countries have plans to include radiofrequency identification ("RFID") elements in passports, with RFID elements carrying personalization data particular to the person carrying the passport. For example, the United States, some European countries, some Latin American countries, Canada, and Australia plan to issue passports having RFID elements in the near future. An RFID element includes an integrated circuit ("IC") or an RFID tag, which includes an IC and an antenna. When the passport is presented at an entry point in a country, the passport readers will read the RFID element embedded inside the passport and to read certain optical information, such as text, printed images, photographs, or bar codes printed on the passport. The information retrieved from the RFID element and the optical information recorded from the passport will then be processed by at least one computer, and based on that information, a person may be admitted to enter into country or kept for further questioning or screening.

There is a need to provide a passport reader that may be used for processing a passport having an RFID element associated with it. The passport reader should also have the ability to capture various optical information and biometric information from the passport. Lastly, the passport reader should also have the ability to capture information related to security features on the passport, such as overt security features or covert security features.

There is also a need to provide a passport reader that is resistant to eavesdropping or whose signal is resistant to being intercepted by other RFID readers, whether or not such eavesdropping is intentional or unintentional. For example, when a passport reader is reading the RFID element in a passport, it is possible that other RFID readers located some distance away from the passport reader may be able to eavesdrop on the communications. The range at which an RFID reader can read a passive RFID element of a passport is typically limited by the ability to transfer adequate power from the RFID reader to the RFID element to power the RFID element and its subsequent communications. This is the limiting factor because adequate power cannot easily be radiated over large distances (while conforming to regulatory requirements such as the FCC). Conversely, the range at which the RFID element of a passport can be read is typically not limited by the ability to radiate communication signals between the RFID reader and the RFID element (when the RFID element is powered by a RFID reader) because these signals can radiate a great distance (even when operating within regulatory requirements, such as the FCC). The communication signals between a first RFID reader and the RFID element (when the RFID element is powered by the first RFID reader) are typically radiated well beyond the first RFID reader and the RFID element, into space where a second RFID reader could intercept them.

It is possible that someone may wish to intentionally read information from another person's RFID element in their passport, without them being aware of it, and then use that information to create a fake passport. Alternatively, several passport readers may be spaced from each other some small distance, for example 10 feet or less, in a series of border control stations located next to each other in an airport. One passport reader located in one station may unintentionally receive information from the RFID element in a passport being read by the passport reader in an adjacent station. Regardless of whether the eavesdropping is intentional or not intentional, there is a need for a passport reader that is able to read information from an RFID element in a passport, when it is inserted into the passport reader, but that also is resistant to eavesdropping or interception by other RFID readers.

The passport reader of the present invention includes a unique antenna design that creates opposing magnetic fields in different portions of the antenna, which cancel at a distance, and thus make it difficult for a distant RFID reader to pick up the information being written to the RFID element in the passport by the passport reader or any other instruction sent from the passcode to the RFID element. However, the unique antenna design still allows near communication between the passport reader and RFID element in the passport. For example, using the unique antenna design in the passport reader 10, an RFID element in a passport may be read if it is less than a distance of 0.5 m from the antenna in the passport reader 10. However, if the RFID element in the passport is at a distance greater than 0.5 m from the antenna in the passport reader 10, then it may be difficult for the passport reader to communicate with the RFID element in the passport. The Simulations included below help illustrate this feature. The passport reader of the present invention allows the RFID element in the passport to be read privately by the border guard unit to whom the passport is presented. Preferably, the passport with the RFID element should be close to the passport reader for the passport reader to read the information from the RFID element. For example, the passport is preferably in the position illustrated in FIG. 2 to properly read the RFID element in the passport. Preferably, the RFID element in the passport is within about 3 cm. from the antenna in the passport reader for the antenna to properly communicate with the RFID element.

There is also a need to provide a passport reader that is resistant to signal jamming. Signal jamming devices may interfere with the reader's ability to read the RFID element in the passport by either sending the passport reader a confusing signal or an overwhelming signal. Jamming is an electronic warfare technique to limit the effectiveness of an opponent's communications equipment. Jamming typically consists of deliberate radiation or reflection of electromagnetic energy for the purpose of preventing or disrupting receipt of information by a receiver. Jamming equipment is typically found in the military environment, as deliberate jamming is largely illegal in nonmilitary applications.

The ability to jam the signal in an RFID-related device can create breaches of security, for example, as follows. It is possible a person may tamper with a passport having an RFID element embedded into it. The person may be able to change some of the optically visible information or printed information on the passport, such as the picture or name of a person. However, it is difficult to tamper with the information stored on the RFID element itself or to replace the RFID element with another RFID element without detection. Therefore, when the optical information and information on a tampered RFID element is read by the passport reader, an alarm may be set off by the border control security system because the information would not match up or correlate. To avoid this possibility, the person carrying the tampered passport may carry a signal jamming device in his or her brief case, so as to jam the signal between the passport reader and the RFID element in their passport. In doing so, the passport reader will not be able to read the RFID element in the passport, and thus a different alarm will be set off. This different alarm will not be related to suspicions that the passport is a fake passport, but rather that the RFID element is malfunctioning. If the RFID element is malfunctioning, the passport is still considered a valid passport, but the person may be subjected to additional levels of screening, which are most likely not as difficult to circumvent as the additional security steps that are initiated when a fake passport sets off alarms.

As mentioned above, the passport reader of the present invention includes the unique antenna design that creates opposing magnetic fields in different portions of the antenna. Another advantage of this antenna design includes the ability to resist signal jamming by signal jamming devices. Because the passport reader cancels or is unable to receive distant communications, the passport reader is unable to receive the jamming signal. The two portions of the antenna create potentials in opposite direction and effectively cancel the jamming signal out. Therefore, it is more resistant to signal jamming devices than the typical passport reader having RFID capabilities.

FIG. 1 illustrates one embodiment of the passport reader 10 of the present invention. The passport reader is used to process passports having RFID elements associated therewith. The passport reader 10 includes a housing 50. The housing 50 includes a first portion 42 and a second portion 44. The first portion 42 includes a window 40 preferably made of glass, which is convenient for viewing the optical information found in the passport, such as printed images, photographs, signatures, personal alphanumeric information, and barcodes. The second portion 44 of the passport reader includes a ledge, which is convenient for supporting half of a passport when the passport 14 is inserted into the passport reader 10 to be read (shown in FIG. 2). The other half of the passport is placed on the glass 40 when the passport 14 is inserted into the passport reader 10 to be used.

Figure 2:
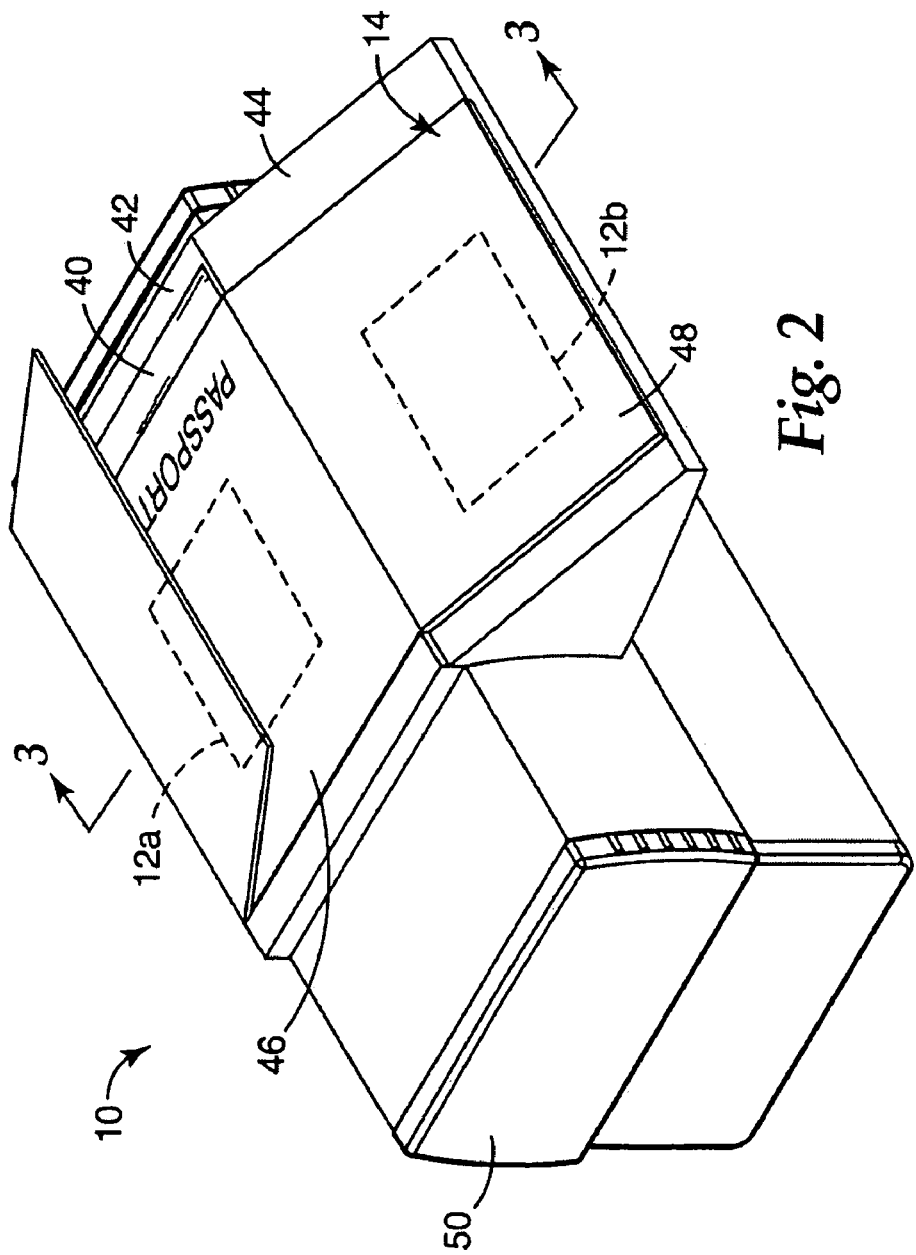
FIG. 2 is the same view as FIG. 1 including a passport being read by the passport reader.

FIG. 2 illustrates the passport reader 10 in combination with a passport 14. The passport 14 is typically a booklet filled with several bound pages. One of the pages usually has a picture of the individual carrying the passport. This same page of the passport may have a variety of covert and overt security features, such as those security features described in U.S. patent application Ser. No. 10/193850, "Tamper-Indicating Printable Sheet for Securing Documents of Value and Methods of Making the Same, filed on Aug. 6, 2004 by the same assignee as the present application, which is hereby incorporated by reference. The other pages of the passport booklet may contain blank pages for receiving a country's stamp as the person is processed through customs. The passport 14 includes at least one RFID element 12. Typically, the RFID element is attached to either the front cover or back cover of the passport booklet 14, usually by adhesive and a cover layer. However, the RFID element may be attached to the passport booklet 14 by any means know in the art. To read the passport, the passport booklet 14 is opened up to the page of the picture of the individual carrying the passport, creating a first portion 46 of the passport and second portion 48 of the passport. Next, the passport booklet is inserted into the passport reader 10, such that the picture in the first portion 46 of the passport 14 is adjacent (or placed over) the glass 40 of the reader 10. The second portion 48 of the passport 14 is in contact with the ledge 44 of the reader. This placement of the passport 14 on the passport reader 50 is convenient for interacting with the passport reader's RFID antenna, which is explained in more detail below in reference to FIGS. 3 and 4.

The passport 14 will contain at least one RFID element 12, however the passport 14 may contain more than just one RFID element 12. The passport 14 illustrated in FIG. 2 includes two RFID elements, a first RFID element 12a in the first portion 46 of the passport 14 and a second RFID element 12b in the second portion 48 of the passport 14. The first and second RFID elements 12a, 12b are illustrated in dotted lines in FIGS. 2-6. However, the RFID elements 12 can be any size or shape known in the art.

Figure 3:
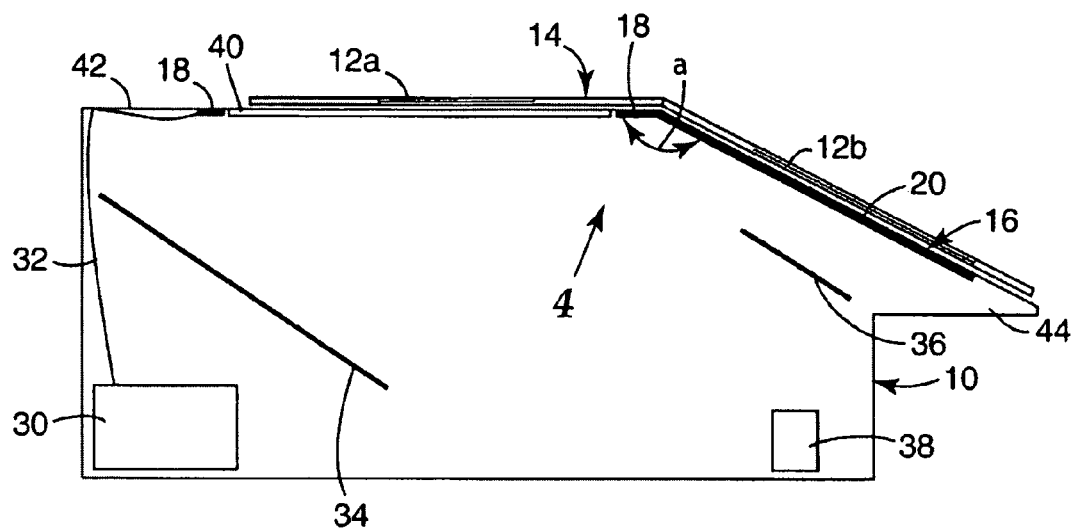
FIG. 3 is a side, cross-sectional, schematic view of the passport reader and passport of FIG. 2.

FIG. 3 is convenient for illustrating the inside of the passport reader 14. The passport reader includes an RFID interrogation source 30. The RFID reader includes a transmitter that may provide energy or information to the RFID element 12 in the passport 14, and a receiver to receive identity and other information from the RFID element 12 in the passport 14. The computing device (not shown) processes the information obtained by the RFID interrogation source 30. Any computing device known in the art is suitable to be used in the passport reader 10. The information received from an RFID element 12 is specific to the particular passport and provides a identification of the passport 14 to which the RFID element 12 is fixed.

Figure 4:
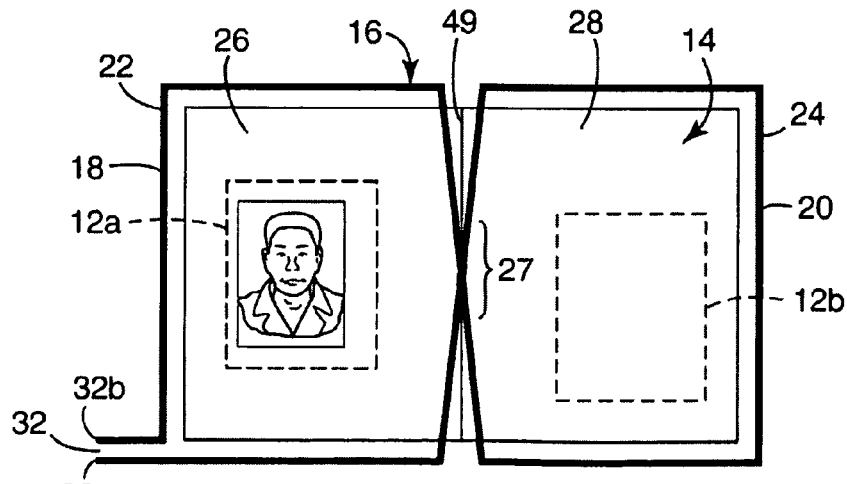
FIG. 4 is a view of the antenna of the passport reader and the passport taken along the view of arrow 4 illustrated in FIG. 3.

The passport reader 14 also includes an antenna 16. The antenna is electrically connected to the RFID interrogation source 30 by electrical wires 32. The antenna 16 is preferably configured to resemble the shape of a "figure 8," one example of which is illustrated in FIG. 4. The figure eight antenna 16 is preferably comprised of two portions. The first portion 18 of the antenna 16 is mounted around the glass 40 in the reader. The second portion 20 of the antenna 16 is mounted around the outer boundaries of the ledge 44. The first portion 18 and the second portion 20 of the antenna 16 are at an angle α relative to each other. Preferably, angle α is in the range of 90° to 270°. More preferably, angle α is in the range of 120° to 240°. Most preferably, angle α is in the range of 135° to 225°. Preferably, the first portion 18 of the antenna 16 is in one plane and the second portion 20 of the antenna 16 is in another plane. However, it is possible that the first portion 18 and second portion 20 of the antenna 16 could be curved around a cylindrical portion of the reader 10.

The transmitter of the RFID interrogation source 30 outputs radio-frequency signals through the antenna 16 to create an electromagnetic field that enables the RFID element 12 to return a radio-frequency signal carrying information from the RFID element. In some configurations, the transmitter initiates communication, and makes use of an amplifier to drive the antenna 16 with a modulated output signal to communicate with the RFID element 12. In other configurations, the RFID element 12 receives a continuous wave signal from the RFID interrogation source 30 and initiates communication by responding immediately with its information stored on the RFID element 12.

A conventional RFID element may be an "active" RFID element that includes an internal power source, or a "passive" RFID element that is energized by the field created by the RFID interrogation source 30. In either case, the RFID elements 12 communicate using a pre-defined protocol, allowing the RFID interrogation source 30 to receive information from one or more RFID elements. The computing device serves as an information management system by receiving the information from the RFID interrogation source 30 and performing some action, such as updating a database. In addition, the computing device may serve as a mechanism for programming data into the RFID elements 12 via the transmitter in the RFID interrogation source 30.

The RFID interrogation source 30 and RFID element may communicate at many frequencies, such as frequencies of 13.56 MHz, 915 MHz, and 115 kHz.

The passport reader 10 also includes a first mirror 34, a second mirror 36 and a camera 38 mounted inside the housing 50 of the passport reader. The passport reader 10 may also include either one or two light sources (not shown) for providing light onto the image provided through the glass 40 in the reader 10. The light sources, mirror systems and camera inside the passport reader 10 are similar to the system described in U.S. Pat. No. 6,611,612, "Security Reader for Automatic Detection of Tampering and Alteration," which is owned by the same assignee as the present patent application, and which is hereby incorporated by reference. An image of the information on the page of the first portion 46 of the passport 14 facing the glass 40 is reflected on the first mirror 34, then reflected on the second mirror 36, and then captured by the camera 38. This optical information is then processed by a computer (not illustrated) connected to camera 38. The passport reader 10 includes the benefits of capturing and processing the optical information on the passport 14, as well as the ability to simultaneously capture and process data from the RFID element 12 in the passport 14.

FIG. 4 illustrates the view of the passport antenna 16 relative to the passport 14 as viewed from arrow 4 illustrated in FIG. 3. As mentioned above, the antenna 16 is preferably configured to resemble the shape of a figure eight. The antenna 16 is constructed in a manner similar to how a figure eight is drawn. The figure eight configuration has a first portion 18, a second portion 20 of the antenna, and an intersection 27 where the first portion 18 and second portion 20 are connected. The first portion 18 and second portion 20 of the antenna 16 are more preferably in the shape of loops or some other geometric shape, such as triangles, rectangles or modifications thereof. The first portion 18 of the antenna 16 includes a first periphery 22. The first periphery surrounds or defines a first area 26. The second portion 20 of the antenna 16 includes a second periphery 24 illustrated by that portion of the antenna. The second periphery surrounds or defines a second area 28. The first area 26 and the second area 28 may differ in size and shape. Preferably, the first area 26 and second area 28 are approximately the same size. Preferably, the first portion 18 and second portion 20 of the RFID element 12 are configured such that at least half of the RFID element 12 is within one of the areas 26, 28 of one of the portions 18, 20 of the antenna. Preferably, when the passport 14 is properly inserted into the passport reader 10, as illustrated in FIG. 2, the first portion of the passport 46 is adjacent the first portion 18 of the antenna 16, the second portion of the passport 48 is adjacent the second portion 20 of the antenna, and the intersection 27 of the antenna 16 is adjacent the spine 49 of the passport 14.

The current flows though the antenna 16 along the path of the figure eight. It starts from 32a, runs along what is illustrated as the "bottom" side of the first portion 46 of the passport 14, below the picture, and then runs through the intersection 27 to what is illustrated as the "top" side of the second portion 48 of the passport 14. The current continues running through the second portion 20 of antenna 16, around the outside edges of the second portion 48 of the passport 14, and eventually through the intersection 27 and to the "top" side of the first portion 26 of the passport 14. Lastly, the current continues running through the first portion 18 of the antenna 16 around the outside edges of the first portion 26 of the passport and back out to 32*b*.

Another way to describe the antenna 16 of the passport reader 10 is that it is a single loop antenna that is twisted 180° to form a first portion 18 and a second portion 20. The intersection 27 is where the loop is twisted at 180°. The twisted single loop antenna may be bent at angle α. The first portion 18 and the second portion 20 of the antenna 16 are in opposite phases. Because the first and second portions 16, 18 of the antenna are in opposite phases, their fields tend to cancel each other at a distance, for example at 0.5 m or greater distance measured from the passport reader 10, while the antenna 16 is able to communicate with the RFID element 12 at near distances from the passport reader, such as 3 cm or less. When the passport 14 is properly placed in the passport reader 10, as illustrated in FIGS. 2-3, the RFID element 12 is 3 cm or less from the antenna 16. Thus, the antenna 16 and the RFID element 12 in the passport 14 are able to properly communicate. Lastly, because the fields of the first portion 18 and second portion 20 cancel each other at a distance from the passport reader, the passport reader 10 is resistant to signal jamming by signal jamming devices.

Figure 5:
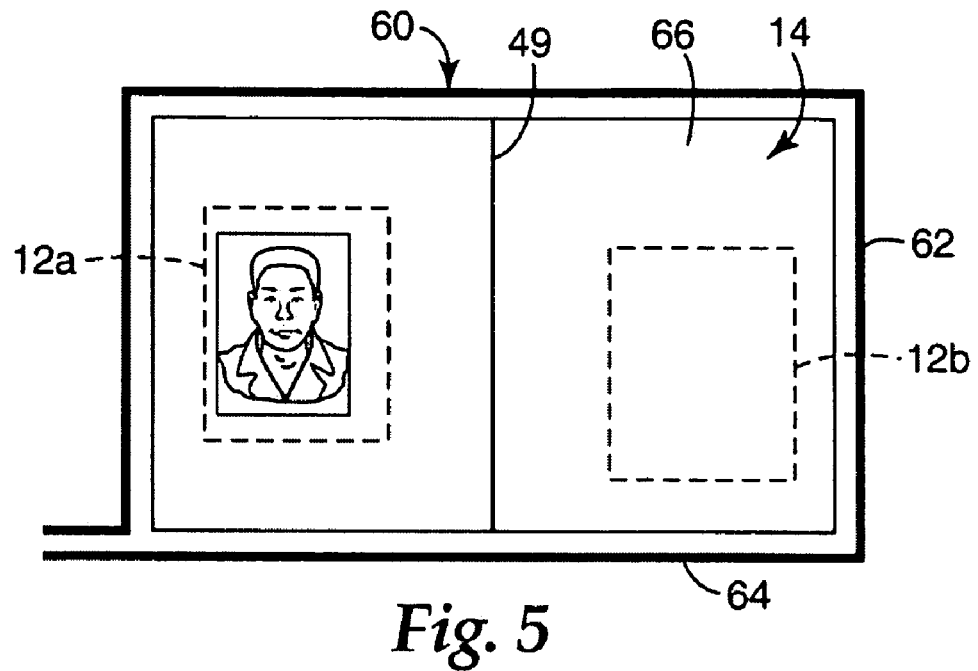
FIG. 5 is a view of an alternative antenna of a passport reader and a passport.

FIG. 5 illustrates an alternative antenna 60 known in the art of RFID enabled passport readers. Antenna 60 is a single loop antenna configuration. The antenna 60 has a single portion 62 having a periphery 64 which defines an area 66. With this prior art single loop antenna design, it is often difficult to generate enough energy in the antenna to power the passive IC chip in the RFID elements 12. In comparison, the figure eight antenna configuration (shown in FIG. 4) generates more field strength than the single antenna design (shown in FIG. 5) using the same amount of current running though the antennas, as explained in more detail below.

Figure 6:
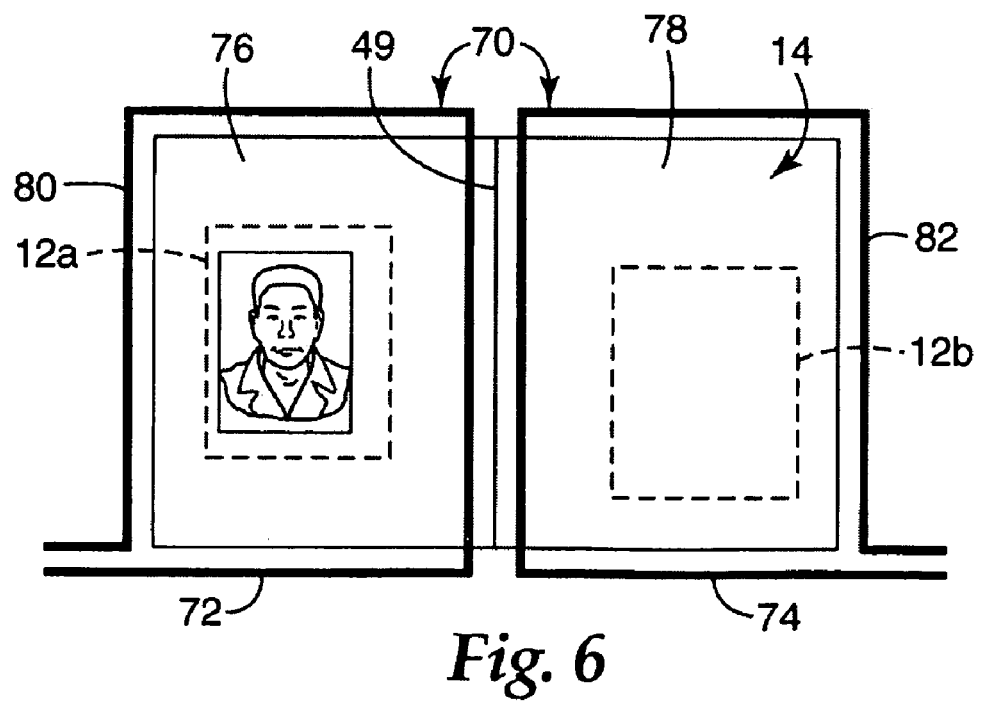
FIG. 6 is a view of yet another alternative antenna of a passport reader and a passport.

FIG. 6 illustrates another alternative antenna 70 known in the art of RFID enabled passport reader. The antenna 70 is made from two separate portions 80, 82. However, the two portions 80, 82 are not connected, do not overlap, and do not intersect, in comparison to the figure eight antenna configuration (shown in FIG. 4). The first portion 80 includes a periphery 72 which defines an area 76. The second portion 82 includes a periphery 74 which defines an area 78. With this prior art two loops antenna design, it is often difficult to generate enough energy in the antenna to power the passive IC chip in the RFID elements 12. In comparison, the figure eight antenna configuration (shown in FIG. 4) generates more field strength than the two loops antenna design (shown in FIG. 6) using the same amount of current running though the antennas.

In another embodiment of the invention, the antenna 16 is driven by a balanced circuit. A means to minimize the radiated electric field of a figure eight antenna 16 is to drive the figure eight antenna 16 in a differential (or balance) mode.

The RF drive signals from an unbalanced coax cable can be converted from an unbalanced to a balanced signal using a balun or other appropriate circuitry. Consider that the function of converting an unbalanced signal to a balanced signal can be integrated into an impedance matching circuit. It is important to recognize that each voltage referred to in the following paragraphs consists of a magnitude and a phase, where a phase of 180 degrees can be shown as a magnitude with a negative sign. Thus, when performing mathematical operations such as addition or subtraction of the field produced each phase component must be properly considered to obtain mathematically correct results.

Figure 9A:
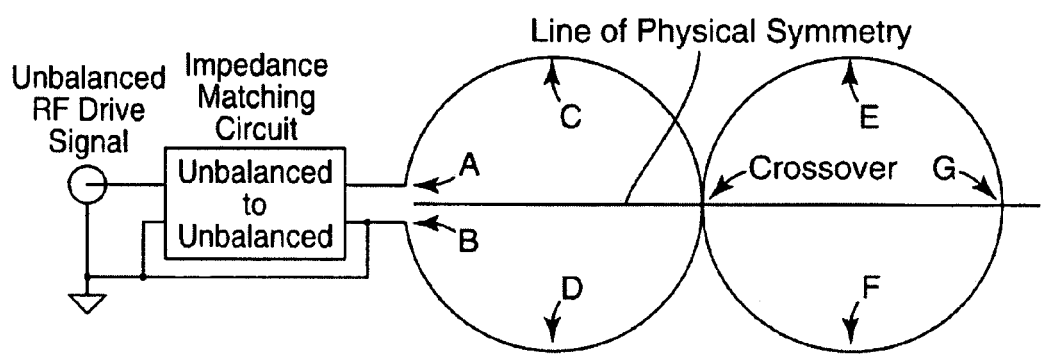
FIGS. 9A-9B are graphs related to the balanced and unbalanced connection of the antenna illustrated in FIG. 4.
Figure 10:
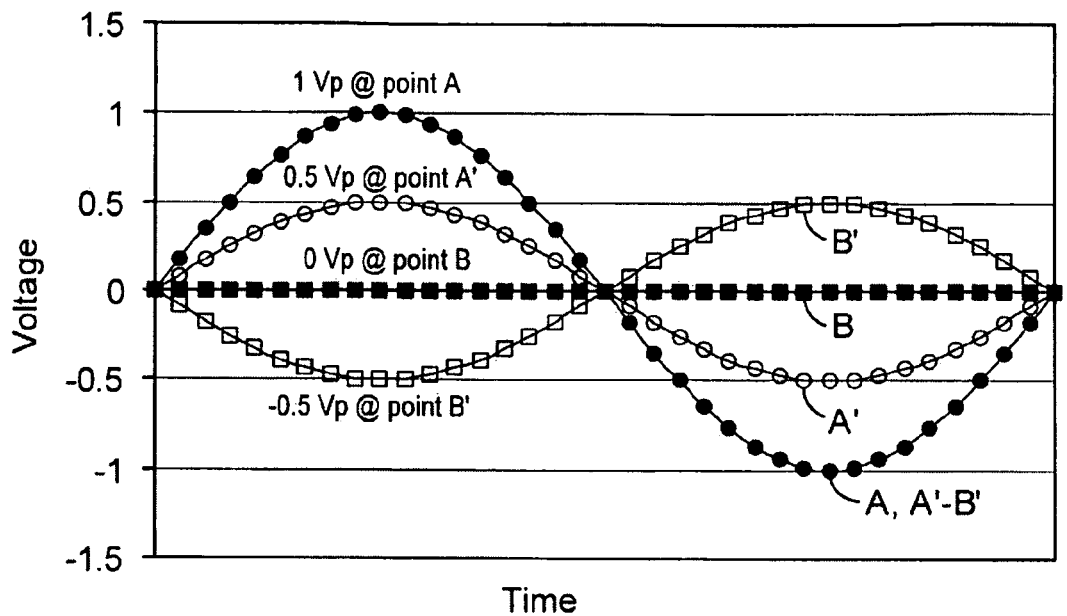
FIG. 10 is a graph illustrating voltage as a function of time.

In an unbalanced to an unbalanced impedance matching circuit, one input and one output signal is connected to a common voltage potential. For the purpose of this discussion, the common voltage will be considered ground potential. A loop antenna connected to an RF signal via such an impedance matching circuit has one end of the loop connected to the output drive terminal of the impedance matching circuit, and the other end of the loop connected to ground. The signal from the matching circuit drives one end of the loop with an RF sinusoidal voltage while the other end of the loop is connected to ground (zero volts). For the purpose of illustration, in FIG. 9A, the voltage at point A is a 1 volt peak (Vp) RF sinusoid and the voltage at point B is at 0 volts, thus the output voltage of the unbalanced network is 1 Vp, referenced to ground. In FIG. 9A the output voltage is measured as the difference between point A and B, i.e. the voltage at point A' minus the voltage at point B. The RF signal at point A is shown in FIG. 10. Consider an electrically short antenna, i.e. an antenna where the current magnitude and the voltage phase along the length of the antenna is nearly constant, such antenna typically having a length of less than $\lambda/10$ where $\lambda$ is the wavelength of the RF signal. For an electrically short antenna, the magnitude of the voltage along the length of the loop varies approximately linearly while there is very little phase shift along the length of the conductive loop. Therefore, the voltage at point G will be ½ Vp because it is physically midway, along the length of the loop antenna, i.e. midway between points A and B, and thus midway between the voltage at points A and B. Continuing this example, the voltage at point C is ⅞ Vp, the voltage at point D is ⅛ Vp, the voltage at point E is ⅝ Vp and the voltage at point F is ⅜ Vp. The voltage at any point on the antenna is positive because every point must be at a voltage between 1 Vp and 0 volts. Because every point on the antenna has the same positive sign, every portion of the antenna will radiate electric fields that are in-phase with the electric field radiated from every other portion of the antenna. Thus the electric fields radiated from each portion of the antenna will tend to constructively add to one another, creating an antenna system that is effective at radiating electric fields at a relatively large distance.

In an unbalanced to a balanced impedance matching circuit, only the input has a connection to ground. The output signals are ideally of equal magnitude with opposite sign. A loop antenna connected to an RF signal via such an impedance matching circuit has one end of the loop connected to one output terminal of the impedance matching circuit, and the other end of the loop connected to the other output terminal. The signals from a balanced impedance matching circuit drive each end of the loop with RF sinusoidal voltages that are of the same magnitude but of opposite sign. This signal drive arrangement of equal magnitude but opposite sign is often referred to as a balanced or differential signal. In a differential signaling arrangement, the relation of the two signals relative to ground is not of fundamental importance. Of fundamental importance in a differential signaling arrangement is the relationship of one signal relative to the other. (This is the opposite of an unbalanced arrangement, where the relation of the signal relative to ground is the fundamental measure of the signal.)

Figure 9B:
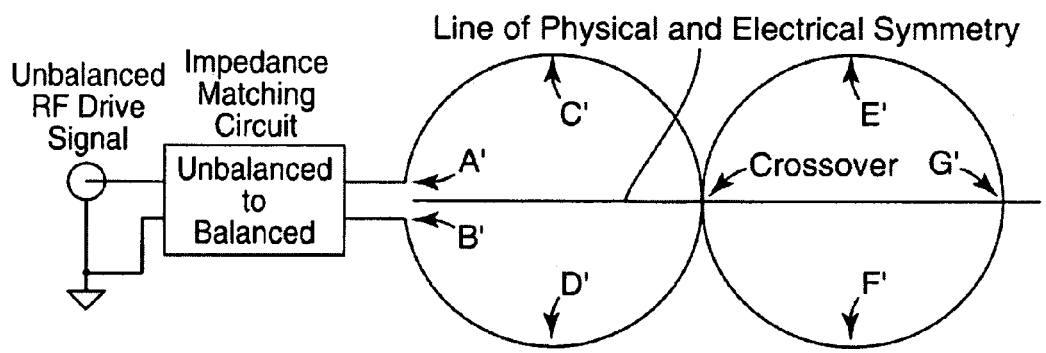

When the difference of the two signals is found, the common potential used to independently measure each voltage is mathematically removed. In FIG. 9B the output voltage is measured as the difference between point A' and B', i.e. the voltage at point A' minus the voltage at point B'. By definition, in a differential signaling system the voltage at point A' must have the opposite sign of the voltage at point B'. For a balanced antenna system versus an unbalanced system with all else being equal, it is necessary that the voltage at point A' minus the voltage at point B' be equal to the voltage at point A minus the voltage at point B. The solution to these constraints is a magnitude of the voltages at points A' and B' that is half the magnitude of the voltage at point A. This is graphically represented in FIG. 10. For the purpose of illustration, referring to FIG. 9B, let the voltage at point A' be 0.5 Vp and the voltage at a point B' be −0.5 Vp as shown in FIG. 10. For an electrically short loop antenna, the voltage along the length of the loop varies approximately linearly, while there is very little phase shift along the length of the conductive loop. Therefore the voltage at point G' will be 0 Vp because it is physically midway, along the length of the loop antenna, between points A' and B', and thus midway between the voltage at points A' and B'. Continuing the example, the voltage at point C' is ⅜ Vp, the voltage at point D' is −⅜ Vp, the voltage at point E' is −⅛ Vp and the voltage at point F' is ⅛ Vp. For every portion of the antenna radiating an electric field with a positive sign, there is a portion of the antenna radiating an electric field with an equal magnitude but opposite sign (or phase). These fields cancel one another. Thus, the electric fields radiated from the antenna will destructively combine, creating an antenna system that is relatively ineffective at radiating electric fields at large distances.

Data shown below empirically demonstrates the reduced radiation of a figure eight antenna driven differentially as in FIG. 9B vs. radiation of an identical figure eight antenna driven with an unbalanced signal as in FIG. 9A. The figure eight antennas were identical, each consisting of two 5 inch loops, the only difference being one antenna was driven using an unbalanced matching circuit and the other antenna using a balanced matching circuit. Each antenna had a Q of 10, a SWR of 1.2, and was driven with a 1 watt RF signal at 13.56 MHz. The radiated field strength produced by each antenna was measured along the X, Y and Z axis at distances of 7, 15 and 20 feet. The X, Y and Z components of the radiation field at each distance was measured and recorded in decibels. The field strength produced by the unbalanced antenna was subtracted from the field strength produced by the balanced antenna with the results shown in Table 1. A negative result would indicate that the balanced antenna radiates less effectively than the unbalanced antenna. The data (all negative) show that the balanced antenna is less effective at radiating a field than an unbalanced antenna, thus rendering communications from a balanced antenna less susceptible to eavesdropping.

TABLE 1

| | Field Component Difference in dB | | | |
|---|---|---|---|---|
| Distance | Antenna Orientation | X | Y | Z |
| 7 feet | X | −19.7 | −16.1 | −18.2 |
| 7 feet | Y | −18.8 | −15.7 | −12.2 |
| 7 feet | Z | −18.1 | −18.2 | −13.7 |
| 15 feet | X | −11.9 | −18.8 | −16.5 |
| 15 feet | Y | −14.6 | −19.9 | −18.5 |
| 15 feet | Z | −21.0 | −19.6 | −15.3 |
| 20 feet | X | −18.0 | −20.8 | −14.5 |
| 20 feet | Y | −17.7 | −20.1 | −14.2 |
| 20 feet | Z | −8.5 | −14.6 | −10.9 |

Because of reciprocity, from this data it is also then evident that the balanced antenna is also more immune to a jamming signal than the unbalanced antenna. Reciprocity is an axiom accepted in the art, that, for example, an antenna that is a relatively efficient radiator of RF energy is conversely a relatively efficient collector of RF energy. Likewise, an antenna that is a relatively poor radiator of RF energy is also a relatively poor collector of RF energy.

In one embodiment of this invention, the passport reader antenna is tuned with an RFID element closely coupled to the antenna, i.e. the RFID element in near proximity to the antenna of the passport reader. Tuning of the antenna of the RFID passport reader in this manner compensates for the loading that happens when two resonate structures, i.e. the antenna of the passport reader and the antenna of the RFID element, are closely coupled. In this embodiment, when a RFID element is in the field of a thusly tuned antenna, the antenna has a low standing wave ratio, which results in the passport reader antenna then reflecting less of the power, thus transmitting more power to the RFID element. Such tuning of the antenna of the RFID reader resolves the problem of the RFID tag loading the field of the RFID reader antenna, i.e. changing of the operative resonating frequency of the passport reader antenna, which results in communication between the antenna and the RFID tag being difficult or impossible.

Methods that RFID reader manufactures have used to solve this loading issue has included changing the modulation index of the reader and some of the circuitry components on the circuit boards of the readers. Because of differences in the loading characteristics caused by various RFID tags from different manufactures, such changes by reader manufactures work only for subsets of a tag group. Thus, to use various RFID tags, the RFID reader user typically needs to make changes to the hardware and the firmware on the reader depending upon which RFID tags the RFID reader is expected to read. By following the implementation of this embodiment, i.e. tuning the antenna of the RFID reader with an RFID element closely coupled to the RFID reader antenna, the need to change the hardware and firmware of the RFID reader is eliminated and thus by implementing such tuning of the RFID reader antenna, all types of RFID tags can be read without hardware or software changes to the reader.

Employing this embodiment of the invention will allow for maximum power transfer to an RFID tag, even when the RFID tag loads down the field of the RFID reader antenna. For example, RFID tags that adhere to the ISO 14443-2 specification for Type B tags require a modulation index of eight to fourteen percent. Table 2 illustrates the difference in modulation index for a Type B tag for an antenna tuned to 13.56 megahertz in free space versus an antenna tuned to 13.56 megahertz with a Type B tag in the RFID reader antenna field.

TABLE 2

| Antenna | Modulation Index - Type B Tag |
|---|---|
| Tuned in free space | 28.3% |
| Tuned with Tag in the field of the antenna | 9.1% |

As illustrated by Table 2, communication by the RFID reader antenna tuned in free space is not possible with the Type B tag. However, following the implementation of this embodiment of the invention, i.e., tuning of the RFID reader antenna with an RFID tag closely coupled to the antenna, shows that communication with the Type B tag was optimized as the modulation index fell well within the required modulation index.

Another parameter that must be met for successful communication with a passive RFID element is power transfer from the field of the RFID reader antenna to the RFID element. By minimizing the power reflected by the RFID reader antenna with an RFID element in the field of the RFID reader antenna, one can maximize the power transfer to the RFID tag. The ISO 14443-2 specification states that to successfully power and thus read a passive tag, an RFID reader complying with this standard must provide a radiated field strength received by the RFID element of at least 1.5 A/m. Table 3 shows the radiated field strength for an RFID element for an RFID reader antenna tuned to 13.56 megahertz in free space versus an RFID reader antenna tuned to 13.56 megahertz with an ISO 14443-2 Type B tag in the field of the RFID reader antenna.

TABLE 3

| Antenna | Radiated Field Strength |
| --- | --- |
| Antenna tuned in free space | 1.15 A/m |
| Tuned with Tag B tag | 2.04 A/m |

As shown by Table 3, following this embodiment of the invention i.e., tuning the antenna of the RFID reader with an RFID tag in the field of the RFID reader, the field strength requirement for successful communication is exceeded.

To exemplify that the magnetic field produced by the figure eight antenna of a passport reader is higher at near proximity to the RFID passport reader and that the magnetic field is lower at a distance from a passport reader with figure eight antenna versus a passport reader equipped with other antenna structures, simulations of antenna magnetic field strengths along the X, Y and Z axis of the antennas at distances ranging from the origin to 10 meters were conducted using "Antenna Analysis Software"—NEC-WIN PRO from Nitney Scientific Inc., Princeton, Utah. The antenna structures chosen for comparison were six inch and eight inch diameter loop antennas. The six inch and eight inch loop antennas are similar to the rectangular loop antenna depicted in FIG. 5. The figure eight antenna was of the shape shown in FIG. 4, with each rectangle having a six inch diagonal.

The eight inch loop antenna was chosen for comparison, as an RFID element in a passport—whether the RFID element is in the cover page or the back page or any other page of the passport book, would then be within the loop antenna with the passport laid upon the antenna as shown in FIG. 5. As apparent from FIG. 5, the origin for the eight inch antenna was not the physical center of the antenna loop, but positioned at a point central to one of the depicted locations of an RFID element in a passport as shown in FIG. 5.

A six inch loop antenna was chosen for comparison, as six inches is slightly larger than the diameter of a typical passport book page. The origin for the six inch loop antenna was oriented at the physical center of the six inch loop.

The origin for the figure eight antenna was oriented at the physical center of either loop of the figure eight antenna. Such position was chosen for the origin as this location is the most probable location for an RFID tag in a passport book to be centered when the passport book is laid upon an RFID enabled passport reader equipped with a figure eight antenna.

Figure 7:
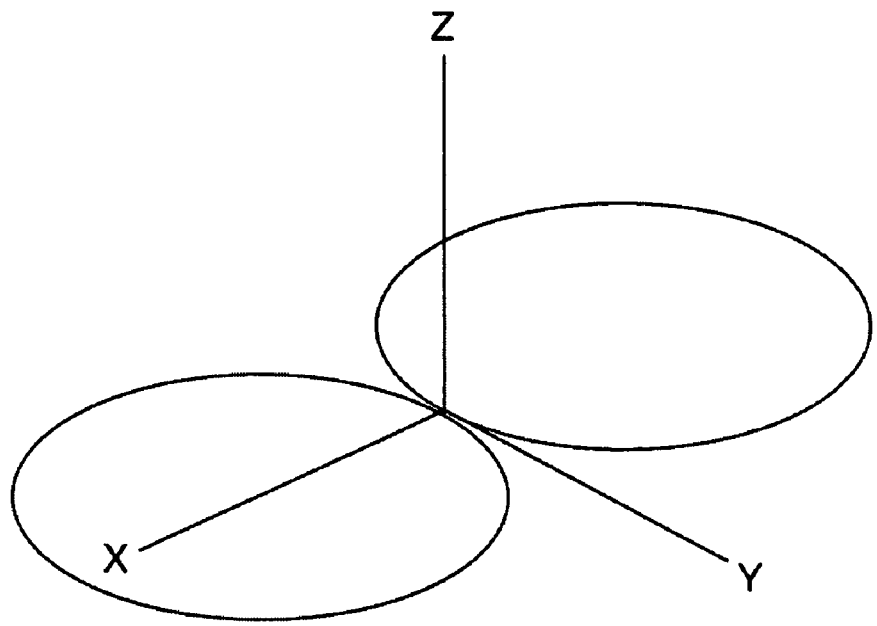
FIG. 7 illustrates the coordinate system of the antenna similar to the antenna illustrated in FIG. 4.

The relative position of the X, Y and Z coordinates for the Figure eight antenna is depicted in FIG. 7. The relative position of the X, Y and Z coordinates for the six inch and eight inch loop antennas is depicted in FIG. 8.

Figure 8:
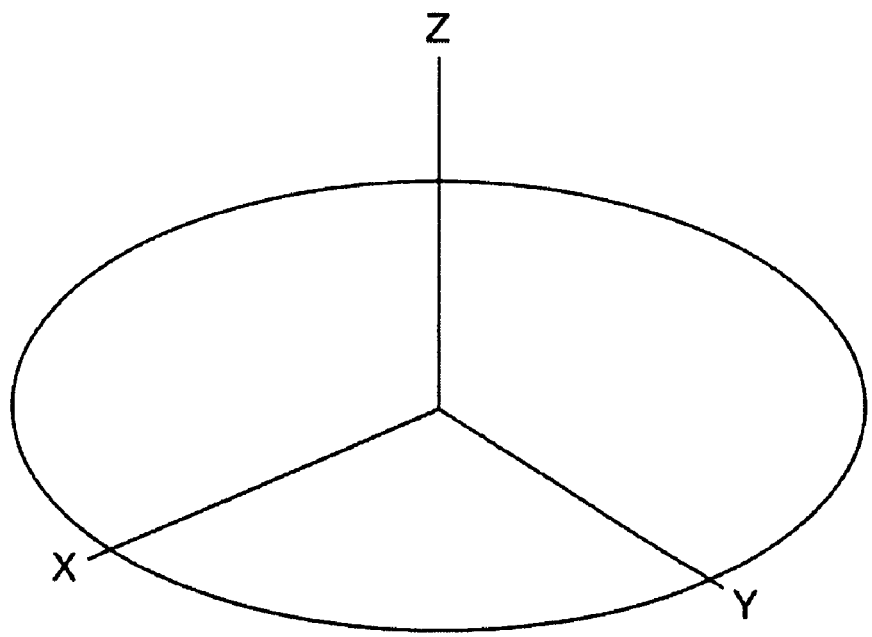
FIG. 8 illustrates the coordinate system of the antenna similar to the antenna illustrated in FIG. 5.
Figure 11:
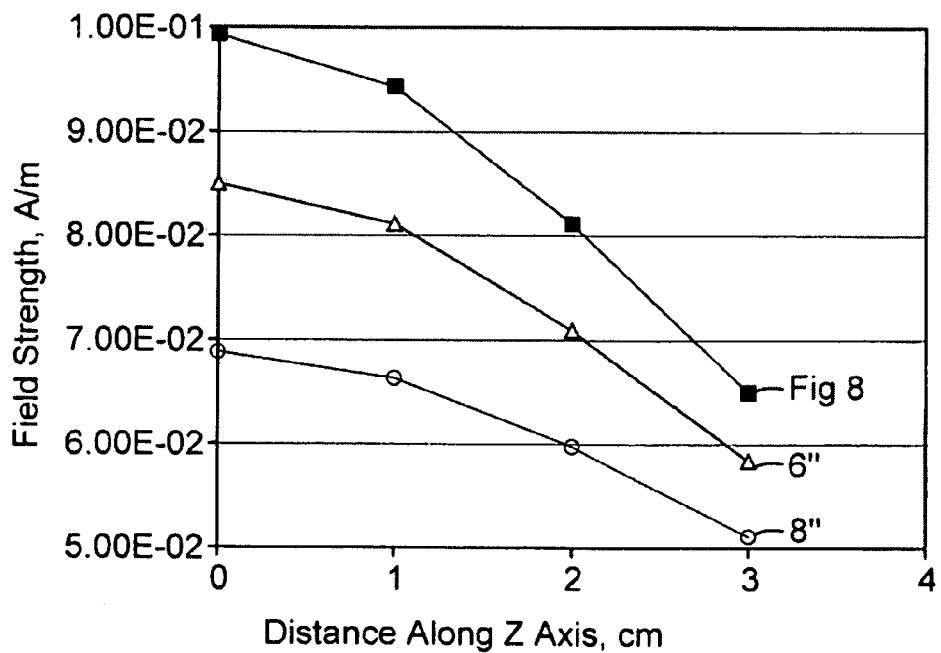
FIGS. 11 through 14 are graphs illustrating field strength as a function of distance.

As illustrated in FIG. 11, the magnitude of the Z component of the magnetic field determined along the Z axis for the FIG. 8, eight inch loop and six inch loop antennas by the NEC-WIN PRO "Antenna Analysis Software" shows that the magnitude is highest for the figure eight antenna at near proximity to the antenna. Table 3 sets forth determined magnetic field magnitudes commencing with the origin through a distance of three centimeters along the Z axis. Only the Z component of the magnetic field radiated by the passport reader antenna is pertinent for this illustration as only the Z component in this orientation of RFID element to reader antenna transfers energy to the RFID element.

Figure 12:
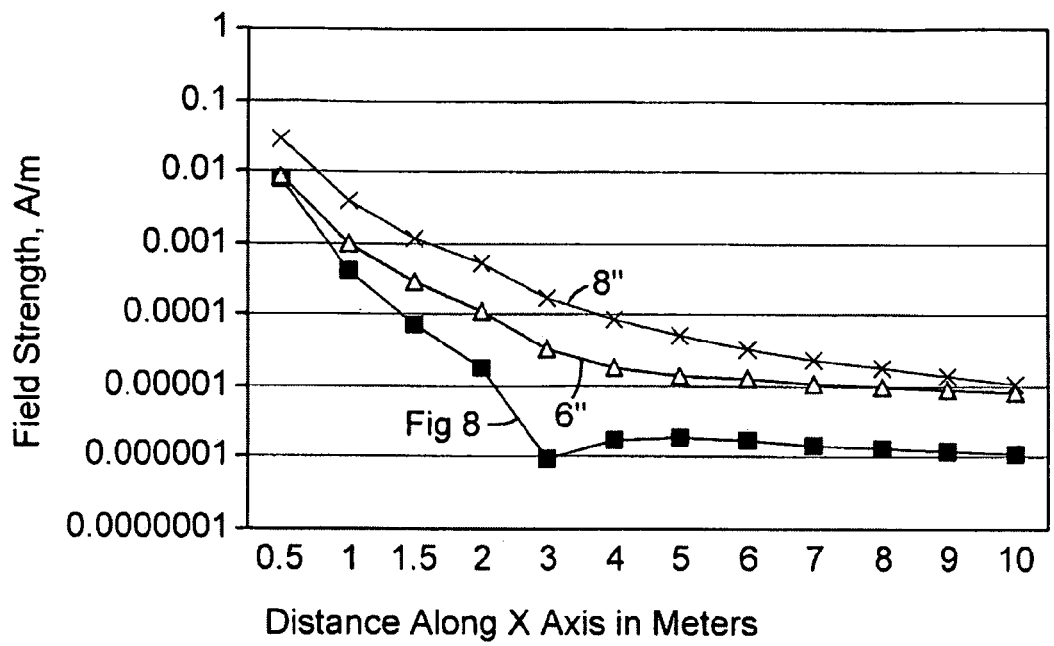
Figure 13:
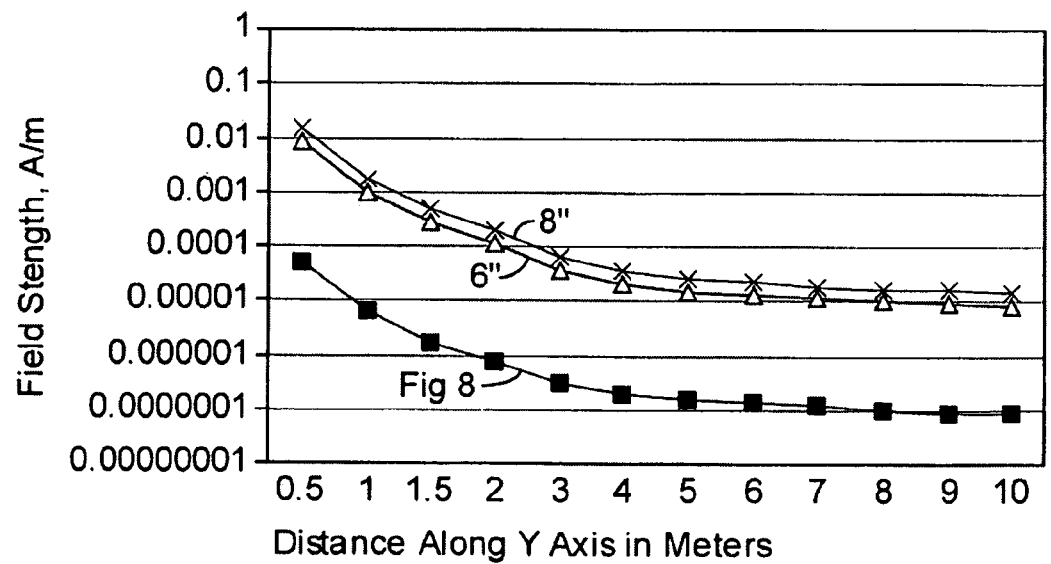
Figure 14:
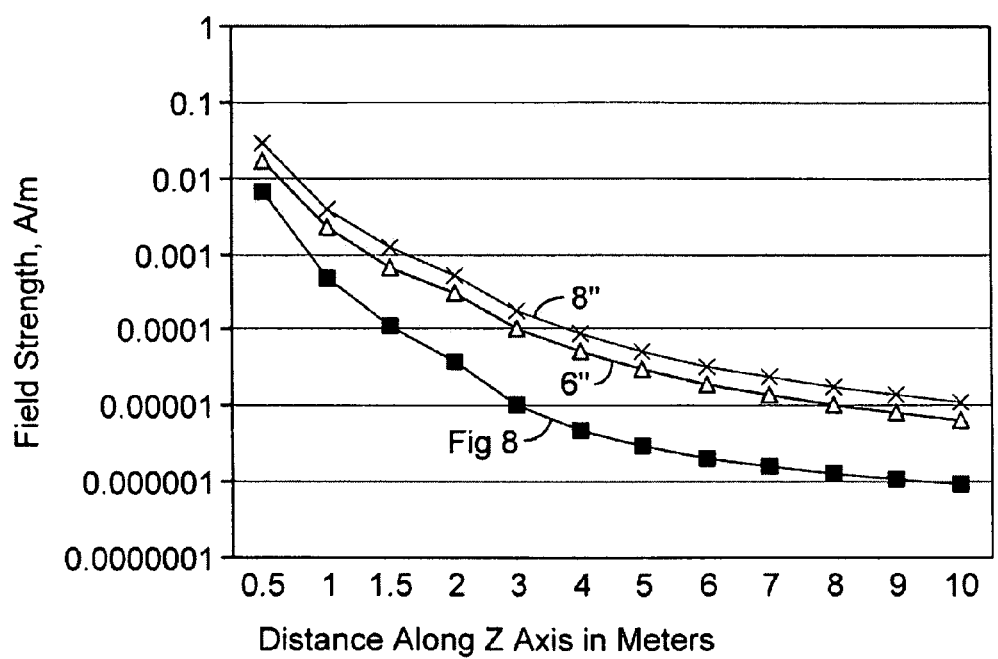

FIGS. 12, 13, and 14 respectively illustrate the magnitude of the magnetic field determined along the X, Y & Z axis for a FIG. 8, an eight inch loop and a six inch loop antenna using the NEC-WIN PRO "Antenna Analysis Software". These Figures show that the magnetic field for the figure eight antenna over a distance of 0.5 meters to 10 meters is approximately an order of magnitude less than the magnetic fields for the eight inch and six inch loop antennas.

One skilled in the art would be able to make the passport reader 10 of the present invention based on the teachings of this application.

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A passport reader for processing a passport having an RFID element associated therewith, comprising:
    (a) an RFID interrogation source for interrogating and obtaining information from an RFID element associated with a passport; and
    (b) an antenna to transmit signals between an RFID element and the RFID interrogation source, wherein the antenna is configured to resemble a shape of a figure eight, and wherein the signals of the antenna are resistant to eavesdropping by other RFID readers.

2. The passport reader of claim 1, wherein the antenna is configured to resemble a shape of a figure eight having a first portion and a second portion, wherein the first portion of the antenna is a first loop and the second portion of the antenna is a second loop.

3. The passport reader of claim 2, wherein the first loop and second loop create opposing magnetic fields which cancel each other at a distance and allow near communications.

4. The passport reader of claim 2, wherein the first loop of the antenna is adjacent a first portion of a passport and the second loop of the antenna is adjacent a second portion of a passport, and wherein the first portion of the passport is a page within a passport booklet and second portion of the passport is another page within the passport booklet.

5. The passport reader of claim 2, wherein the first loop is in a first plane and the second loop is in a second plane, wherein the first plane and the second plane are at an angle $\alpha$ relative to each other, and wherein the angle $\alpha$ is between the range of 90° to 270°.

6. The passport reader of claim 1, wherein the antenna is resistant to signal jamming by signal jamming devices.

7. A combination of a passport and the passport reader of claim 1.

8. A passport reader for processing a passport having an RFID element associated therewith, comprising:
    (a) an RFID interrogation source for interrogating and obtaining information from the RFID element associated with a passport; and
    (b) an antenna to transmit signals between an RFID element and the RFID interrogation source, wherein the antenna includes first portion and a second portion, wherein the first portion of the antenna includes a first periphery forming a first area and the second portion of the antenna includes a second periphery forming a second area, wherein the first area and second area are adjacent, and wherein the first portion and second portion of the antenna create opposing magnetic fields which cancel each other at a distance and allow near communications.

9. The passport reader of claim 8, wherein the first portion of the antenna is a first loop and the second portion of the antenna is a second loop.

10. The passport reader of claim 9, wherein the first loop of the antenna is adjacent a first portion of a passport and the second loop of the antenna is adjacent a second portion of a passport, and wherein the first portion of the passport is a page within a passport booklet and the second portion of the passport is another page within the passport booklet.

11. The passport reader of claim 9, wherein the first loop is in a first plane and the second loop is in a second plane, wherein the first plane and the second plane are at an angle $\alpha$ relative to each other, and wherein the angle $\alpha$ is between the range of 90° to 270°.

12. The passport reader of claim 9, wherein the antenna is resistant to signal jamming by signal jamming devices.

13. A combination of a passport and the passport reader of claim 8.

14. A passport reader for processing a passport having an RFID element associated therewith, comprising:
    (a) an RFID interrogation source for interrogating and obtaining information from the RFID element associated with a passport; and
    (b) an antenna to transmit signals between an RFID element and the RFID interrogation source, wherein the antenna is configured to resemble the shape of a figure eight, and wherein the antenna is resistant to signal jamming by signal jamming devices.

15. The passport reader of claim 14, wherein the antenna is configured to resemble a shape of a figure eight having a first portion and a second portion, wherein the first portion of the antenna is a first loop and the second portion of the antenna is a second loop.

16. The passport reader of claim 15, wherein the first loop and second loop create opposing fields which cancel at a distance and allow near communications.

17. The passport reader of claim 15, wherein the first loop of the antenna is adjacent a first portion of a passport and the second loop of the antenna is adjacent a second portion of a passport, and wherein the first portion of the passport is a page within a passport booklet and the second portion of the passport is another page within the passport booklet.

18. The passport reader of claim 15, wherein the first loop is in a first plane and the second loop is in a second plane, wherein the first plane and the second plane are at an angle $\alpha$ relative to each other, and wherein the angle $\alpha$ is between the range of 90° to 270°.

19. The passport reader of claim 14, wherein the signals of the antenna are resistant to eavesdropping by other RFID readers.

20. A combination of a passport and the passport reader of claim 14.

21. A passport reader for processing a passport having an RFID element associated therewith, comprising:
    (a) an RFID interrogation source for interrogating and obtaining information from the RFID element associated with a passport; and
    (b) an antenna to transmit signals between an RFID tag and the RFID interrogation source, wherein the antenna includes first portion and a second portion, wherein the first portion of the antenna includes a first periphery forming a first area and the second portion of the antenna includes a second periphery forming a second area, wherein the first area and second area are adjacent, wherein the first area and the second area of the antenna create opposing magnetic fields that cancel each other at a distance, and wherein the signals of the antenna are resistant to eavesdropping by the other RFID readers located greater than about 10 meters from the antenna.

22. The passport reader of claim 21, wherein the antenna is configured to resemble a shape of a figure eight having a first portion and a second portion, wherein the first portion of the antenna is a first loop and the second portion of the antenna is a second loop.

23. The passport reader of claim 22, wherein the first loop and second loop create opposing magnetic fields which cancel each other at a distance and allow near communications.

24. The passport reader of claim 22, wherein the first loop of the antenna is adjacent a first portion of a passport and the second loop of the antenna is adjacent a second portion of a passport, and wherein the first portion of the passport is a page within a passport booklet and the second portion of the passport is another page within the passport booklet.

25. The passport reader of claim 22, wherein the first loop is in a first plane and the second loop is in a second plane, wherein the first plane and the second plane are at an angle $\alpha$ relative to each other, and wherein the angle $\alpha$ is between the range of 90° to 270°.

26. The passport reader of claim 21, wherein the antenna is resistant to signal jamming by signal jamming devices.

27. A combination of a passport and the passport reader of claim 21.

28. A passport reader for processing a passport having an RFID element associated therewith, comprising:
    (a) an RFID interrogation source for interrogating and obtaining information from an RFID element associated with a passport; and
    (b) an antenna to transmit signals between an RFID element and the RFID interrogation source, wherein the antenna is configured to resemble a shape of a figure eight having a first portion and a second portion, wherein the first portion and the second portion of the antenna create opposing magnetic fields which cancel each other at a distance and allow near communications.

29. The passport reader of claim 28, wherein the antenna includes a first portion and a second portion, wherein the first portion of the antenna is a first loop and the second portion of the antenna is a second loop.

30. The passport reader of claim 29, wherein the first loop of the antenna is adjacent a first portion of a passport and the second loop of the antenna is adjacent a second portion of a passport, and wherein the first portion of the passport is a page within a passport booklet and the second portion of the passport is another page within the passport booklet.

31. The passport reader of claim 29, wherein the first loop is in a first plane and the second loop is in a second plane, wherein the first plane and the second plane are at an angle $\alpha$ relative to each other, and wherein the angle $\alpha$ is between the range of 90° to 270°.

32. The passport reader of claim 28, wherein the antenna is resistant to signal jamming by signal jamming devices.

33. A combination of a passport and the passport reader of claim 28.

34. A passport reader for processing a passport having an RFID element associated therewith, comprising:
   (a) an RFID interrogation source for interrogating and obtaining information from the RFID element associated with a passport; and
   (b) an antenna to transmit signals between an RFID tag and the RFID interrogation source, wherein the antenna includes first portion and a second portion, wherein the first portion of the antenna includes a first periphery forming a first area and the second portion of the antenna includes a second periphery forming a second area, wherein the first area and second area are adjacent, and wherein the first portion and the second portion of the antenna create opposing magnetic fields that cancel each other at a distance such that the antenna is resistant to signal jamming by signal jamming devices.

35. The passport reader of claim 34, wherein the antenna is configured to resemble a shape of a figure eight having the first portion and the second portion, wherein the first portion of the antenna is a first loop and the second portion of the antenna is a second loop.

36. The passport reader of claim 34, wherein the opposing magnetic fields allow near communications.

37. The passport reader of claim 35, wherein the first loop of the antenna is adjacent a first portion of a passport and the second loop of the antenna is adjacent a second portion of a passport, and wherein the first portion of the passport is a page within a passport booklet and the second portion of the passport is another page within the passport booklet.

38. The passport reader of claim 35, wherein the first loop is in a first plane and the second loop is in a second plane, wherein the first plane and the second plane are at an angle α relative to each other, and wherein the angle α is between the range of 90° to 270°.

39. The passport reader of claim 34, wherein the signals of the antenna are resistant to eavesdropping by other RFID readers.

40. The passport of claim 34, further comprising a camera and a window to view optical information from the passport.

41. A combination of a passport and the passport reader of claim 34.

42. A passport reader for processing a passport having an RFID element associated therewith, comprising:
   (a) an RFID interrogation source for interrogating and obtaining information from the RFID element associated with a passport; and
   (b) an antenna to transmit signals between an RFID tag and the RFID interrogation source, wherein the antenna is configured to resemble a shape of a figure eight having a first portion and a second portion, wherein the first portion of the antenna is adjacent a first portion of a passport and the second portion of the antenna is adjacent a second portion of a passport, and wherein the signals of the antenna are resistant to eavesdropping by other RFID readers.

43. The passport reader of claim 42, wherein the first portion of the antenna is a first loop and the second portion of the antenna is a second loop.

44. The passport reader of claim 43, wherein the first loop and second loop create opposing magnetic fields which cancel each other out at a distance and allow near communications.

45. The passport reader of claim 42, wherein the first portion of the passport is a page within a passport booklet and the second portion of the passport is another page within the passport booklet.

46. The passport reader of claim 43, wherein the first loop is in a first plane and the second loop is in a second plane, wherein the first plane and the second plane are at an angle α relative to each other, and wherein the angle α is between the range of 90° to 270°.

47. The passport reader of claim 42, wherein the antenna is resistant to signal jamming by signal jamming devices.

48. A combination of a passport and the passport reader of claim 42.

49. A passport reader for processing a passport having an RFID element associated therewith, comprising:
   (a) an RFID interrogation source for interrogating and obtaining information from the RFID element associated with a passport; and
   (b) an antenna to transmit signals between an RFID tag and the RFID interrogation source, wherein the antenna is configured to resemble a shape of a figure eight having a first portion and a second portion, wherein the first portion of the antenna is adjacent a first portion of a passport and the second portion of the antenna is adjacent a second portion of a passport, and wherein the first portion and the second portion of the antenna create opposing magnetic fields which cancel each other at a distance and allow near communications.

50. The passport reader of claim 49, wherein the first portion of the antenna is a first loop and the second portion of the antenna is a second loop.

51. The passport reader of claim 50, wherein the first loop and second loop create opposing fields which cancel at a distance and allow near communications.

52. The passport reader of claim 49, wherein the first portion of the passport is a page within a passport booklet and the second portion of the passport is another page within the passport booklet.

53. The passport reader of claim 50, wherein the first loop is in a first plane and the second loop is in a second plane, wherein the first plane and the second plane are at an angle α relative to each other, and wherein the angle α is between the range of 90° to 270°.

54. The passport reader of claim 49, wherein the antenna is resistant to signal jamming by signal jamming devices.

55. A combination of a passport and a passport reader of claim 49.

56. A passport reader for processing a passport having an RFID element associated therewith, comprising:
   (a) an RFID interrogation source for interrogating and obtaining information from the RFID element associated with a passport; and
   (b) an antenna to transmit signals between an RFID tag and the RFID interrogation source, wherein the antenna is configured to resemble a shape of a figure eight having a first portion and a second portion, wherein the first portion of the antenna is adjacent a first portion of a passport and the second portion of the antenna is adjacent a second portion of a passport, and wherein the antenna is resistant to signal jamming by signal jamming devices.

57. The passport reader of claim 56, wherein the first portion of the antenna is a first loop and the second portion of the antenna is a second loop.

58. The passport reader of claim 57, wherein the first loop and the second loop create opposing fields which cancel at a distance and allow near communications.

59. The passport reader of claim 57, wherein the first loop of the antenna is adjacent a first portion of a passport and the second loop of the antenna is adjacent a second portion of a passport, and wherein the first portion of the passport is a page within a passport booklet and the second portion of the passport is another page within the passport booklet.

60. The passport reader of claim 57, wherein the first loop is in a first plane and the second loop is in a second plane, wherein the first plane and the second plane are at an angle $\alpha$ relative to each other, and wherein the angle $\alpha$ is between the range of 90° to 270°.

61. The passport reader of claim 56, wherein the signals of the antenna are resistant to eavesdropping by other RFID readers.

62. A combination of a passport and a passport reader of claim 56.

* * * * *

UNITED STATES PATENT AND TRADEMARK OFFICE
CERTIFICATE OF CORRECTION

| | | |
|---|---|---|
| PATENT NO. | : 7,591,415 B2 | Page 1 of 1 |
| APPLICATION NO. | : 10/953200 | |
| DATED | : September 22, 2009 | |
| INVENTOR(S) | : Jesme | |

It is certified that error appears in the above-identified patent and that said Letters Patent is hereby corrected as shown below:

Title page
Column 2 (Other Publications); line 4, Delete "ePasport" and insert -- ePassport --, therefor.

Column 6
Line 54; After "Same," insert -- (Attorney Docket No. 59777US002) --.

Signed and Sealed this

Twentieth Day of September, 2011

David J. Kappos
*Director of the United States Patent and Trademark Office*